United States Patent
Sun et al.

(10) Patent No.: US 6,754,202 B1
(45) Date of Patent: Jun. 22, 2004

(54) NETWORK CALL-BACK DATA CAPTURE METHOD AND APPARATUS

(75) Inventors: Shirley Sun, Saratoga, CA (US); Gilbert Hu, Fremont, CA (US)

(73) Assignee: Altigen Communications, Inc., Fremont, CA (US)

( * ) Notice: Subject to any disclaimer, the term of this patent is extended or adjusted under 35 U.S.C. 154(b) by 784 days.

(21) Appl. No.: 09/593,823

(22) Filed: Jun. 13, 2000

Related U.S. Application Data (60) Provisional application No. 60/158,987, filed on Oct. 12, 1999, and provisional application No. 60/139,342, filed on Jun. 15, 1999.

(51) Int. Cl.[7] ............................................. H04L 12/66
(52) U.S. Cl. .................. 370/352; 379/210.01; 370/354; 370/356; 370/395.52
(58) Field of Search ........................... 370/259, 395.52, 370/395.54, 352, 354, 356; 379/210.01

(56) References Cited

U.S. PATENT DOCUMENTS

| | | | | | |
|---|---|---|---|---|---|
| 5,867,495 A | * | 2/1999 | Elliott et al. | ................. | 370/352 |
| 6,347,085 B2 | * | 2/2002 | Kelly | ......................... | 370/352 |
| 6,477,246 B1 | * | 11/2002 | Dolan et al. | ........... | 379/211.02 |
| 2002/0018549 A1 | * | 2/2002 | Burg | ..................... | 379/209.01 |
| 2003/0067908 A1 | * | 4/2003 | Mattaway et al. | .......... | 370/352 |

* cited by examiner

*Primary Examiner*—Wellington Chin
*Assistant Examiner*—Mark A Mais
(74) *Attorney, Agent, or Firm*—Townsend and Townsend and Crew LLP (57) ABSTRACT

A method for operating a telecommunications system comprises receiving over a computer network, a plurality of data packets from a first telecommunications system, in a second telecommunications system, determining a telephone number in response to a first set data packets from the plurality of data packets, determining computer network call-back data in response to a second set of data packets from the plurality of data packets, determining message data in response to a third set of data packets from the plurality of data packets, and storing the message data and the computer network call-back data in the second telecommunications system, the message data and the computer network call-back data associated with the telephone number.

20 Claims, 8 Drawing Sheets

NETWORK CALL-BACK DATA CAPTURE METHOD AND APPARATUS

CROSS-REFERENCE TO RELATED APPLICATIONS

The present invention disclosure claims priority to U.S. Patent Application No. 60/158,987, filed Oct. 12, 1999, and U.S. Patent Application No. 60/139,342, filed Jun. 15, 1999. These applications are herein by incorporated by reference for all purposes. U.S. patent application Ser. No. 08/818,390, Filed Mar. 14, 1997, also incorporated by reference for all purposes.

BACKGROUND OF THE INVENTION

The present invention relates to computer telephony. More specifically, the present invention relates to computer network-based telecommunication systems and servers.

Offices today share many modern conveniences, such as fax machines, electronic mail, commonly known as e-mail, high-powered computers, voice mail, and the like. Offices also share many of the same inconveniences, such as jammed copy machines, broken computers, and even disheveled piles of paper having scribbled telephone numbers. Often, just who the telephone number actually calls has long been forgotten, but typically the scraps are not thrown away, "just in case" the numbers are still needed.

These scraps of papers are commonly a byproduct of voice mail systems. In particular, when users retrieve their voice mail messages, the caller leaves a message and a number they can be reached at, also known as a call-back number. So the user can return the call, she typically scribbles the call-back number on an envelope, an unrelated piece of paper, a sticky pad, and the like. Later, when convenient, the user can return the caller's call. As noted above, when the user has a great number of messages to return, these scraps of paper can get shuffled around and even lost. As a result, the user may not be able to return the message. Even if the user can find the number, she must dial it over and over, if there is no answer.

One of the recent solutions to reduce the need for voice mail users to write down call-back numbers left in their mail boxes has been use of user or caller call-back technology. One of the pioneering companies in the area of call-back technology has been AltiGen Communications, the assignee of the present invention. With call-back functionality, the caller is prompted to enter her call-back number by way of pressing keys on her telephone keypad, which in turn generates well known DTMF tones. These DTMF tones are then recorded into the voice mail system. Later when the owner of the mail box reviews the message, she can direct the voice mail system to dial the same DTMF tones to return the caller's message.

Drawbacks to having callers leave call-back telephone numbers include that it required the caller to enter their call-back telephone number in a manner different from the way the caller would leave a message. For example, the caller would leave a voice message, and then enter a call-back telephone number with a numeric keypad. This way of providing call-back service was potentially dangerous for the caller, for example, if the caller were driving on crowded expressway. In such a case, the caller would have to first fumble for the telephone, take her eyes off traffic to make sure the phone was in the proper position, and while looking at the telephone keypad press a series of keys.

In a concept pioneered by AltiGen communications, principles of computer telephony are now being adapted for telecommunications systems utilizing computer networks for transmission of data. However, the concept of a call-back telephone numbers applied to computer network-based calls has not heretofore been envisioned or implemented. Potential obstacles become apparent when attempting to apply telephone number call-back capture techniques to computer network-based communications. For example, potential drawbacks include that users' typically have no idea what their computer network address are, e.g. IP address, DNS addresses, and the like; or even how to specify computer-network call-back data characters with just a telephone keypad; and the like. Other such drawbacks can be envisioned.

Thus, in light of the above, what is needed in the industry are methods and apparatus for providing computer-network call-back data for computer network-based telephony.

SUMMARY OF THE INVENTION

The present invention relates to methods and apparatus for improved telephone messaging. In particular, the present invention relates to capturing computer network call-back data using novel methods and apparatus.

According to an embodiment of the present invention, a method for operating a telecommunications system includes receiving over a computer network, a plurality of data packets from a first telecommunications system, in a second telecommunications system. The method also includes determining a telephone number in response to a first set data packets from the plurality of data packets, determining computer network call-back data in response to a second set of data packets from the plurality of data packets, and determining message data in response to a third set of data packets from the plurality of data packets. Storing the message data and the computer network call-back data in the second telecommunications system, the message data and the computer network call-back data associated with the telephone number is also included.

According to another embodiment, a computer program product for operating a telecommunications server including a processor includes executable code that directs the processor to store a plurality of data packets from a first telecommunications system, over a computer network, in a memory, executable code that directs the processor to determine a telephone number in response to a first set data packets from the plurality of data packets, and executable code that directs the processor to determine a network call-back data in response to a second set of data packets from the plurality of data packets. Code that directs the processor to store the network call-back data, the network call-back data associated with the telephone number is also included. The codes reside on a tangible media.

According to yet another embodiment, a telecommunications system includes a processor and a processor readable memory. The processor readable memory includes code configured to direct the processor to store a plurality of data packets from a calling telecommunications system, in a memory, code configured to direct the processor to determine a destination identifier in response to a first set data packets from the plurality of data packets, and code configured to that direct the processor to determine call-back data in response to a second set of data packets from the plurality of data packets. The processor readable memory also includes code configured to direct the processor to associate the call-back data associated with the destination identifier.

BRIEF DESCRIPTION OF THE DRAWINGS

In order to more fully understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which.

DESCRIPTION OF SPECIFIC EMBODIMENTS

Figure 1:
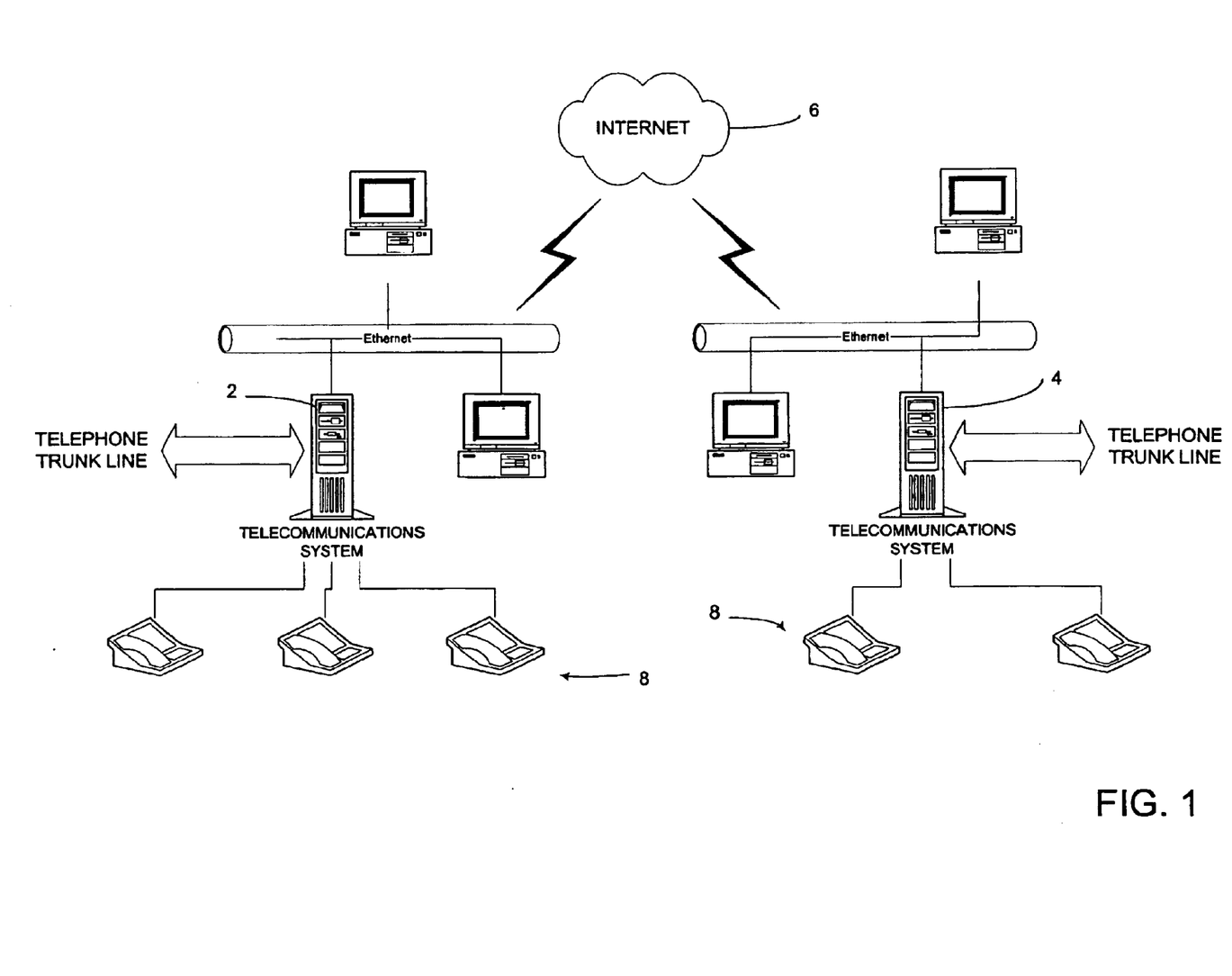
FIG. 1 is an overview block diagram of an embodiment of the present invention.

FIG. 1 is an overview block diagram of an embodiment of the present invention. FIG. 1 illustrates a telecommunications system 2 and a telecommunications system 4, coupled via a network 6.

Each telecommunications system or server typically provides conventional telephone service to a plurality of respective telephones 8. Further, each telecommunications system also provides telephone service across a computer network, for example wide area networks, including the Internet, internal intranets, local area networks, packetized networks and the like. Further description of these capabilities will be given below. Further disclosure can be found in: U.S. patent application Ser. No. 08/818,390, entitled Mixed-Media Communication Apparatus and Method, filed Mar. 14, 1997, and assigned to the present assignee. This application is hereinby incorporated by reference for all purposes.

In the present embodiment, a caller coupled to telecommunications system 2 typically picks-up the telephone handset, and dials a desired telephone number. When the telephone number is an internal extension, telecommunications system 2 couples the call to the other extension; and when the telephone number is an outside telephone number, telecommunications system 2 typically couples the call to the telephone trunk line.

When the user dials specific telephone numbers, telecommunications system 2 may determine that the most efficient method for making the telephone call is through network 6. In response, telecommunications system 2 formats the telephone call request, and sends the data to telecommunications system 4. When telecommunications system 4 receives the telephone call request, telecommunications system 4 determines the telephone number, and then rings that telephone. The telephone call may be for an internal extension or for an outside telephone. When the telephone is answered, the caller and the receiver can then communicate.

In the present embodiment, as the caller or the receiver communicate, the analog data, typically their voices, are digitized and fragmented into packets of data by the respective telecommunications systems. These packets of data are then passed to the other telecommunications system via computer network 6. The other telecommunications system re-assembles the data packets and converts them back into analog form.

When making a network telephone call, telecommunications systems typically use a combination of network protocols to help ensure the arrival of data across the network. For example, in the present embodiment, transmission control protocol (TCP) is used. In alternative embodiments of the present invention, other control protocols, and other combinations of control protocols may be used, for example: TCP, IP, UDP and the like.

Figure 2:
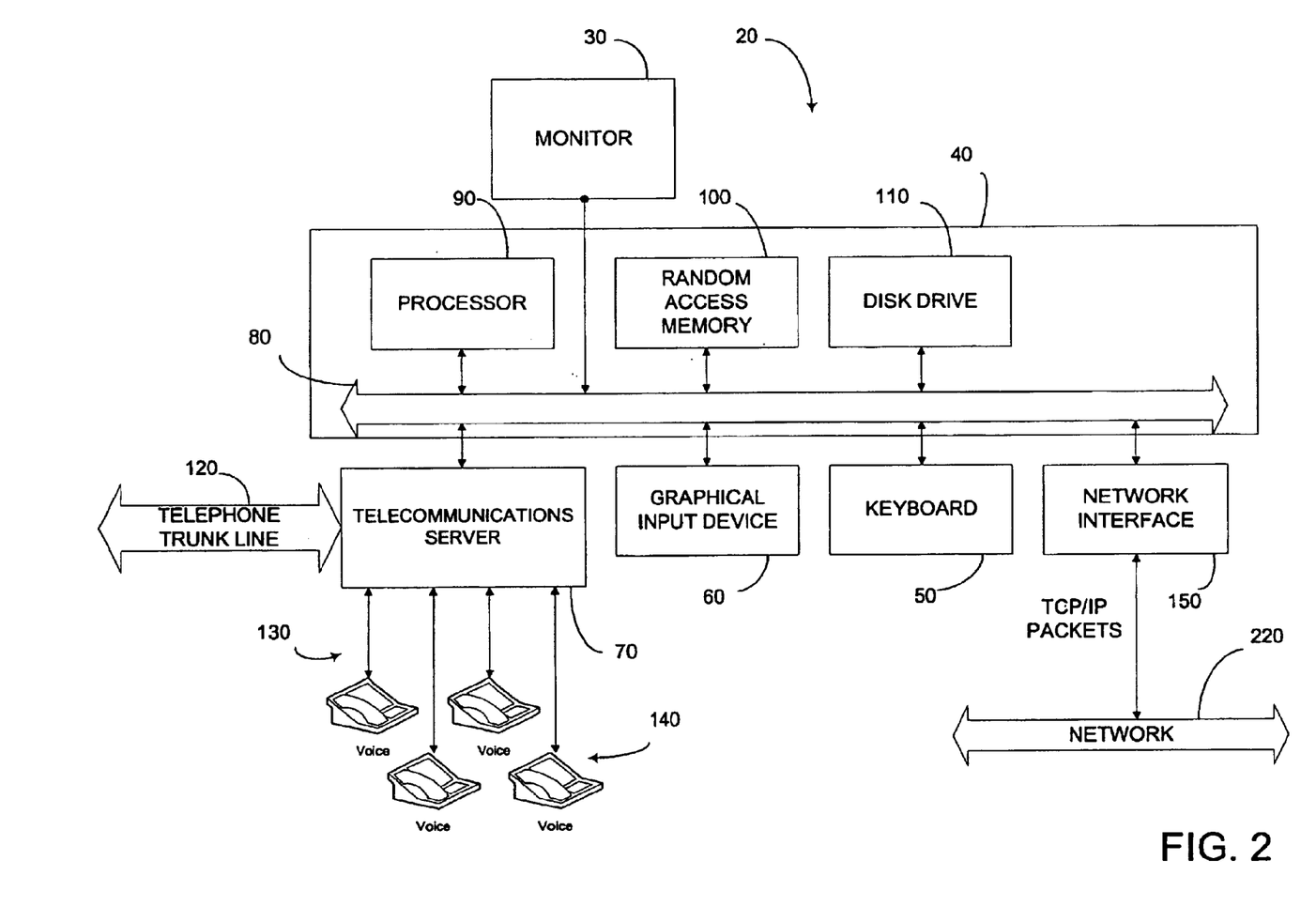
FIG. 2 is a block diagram of an embodiment of the present invention.

FIG. 2 is a block diagram of a telecommunications system 20 according to a preferred embodiment of the present invention. Telecommunications system 20 includes a monitor 30, a computer 40, a keyboard 50, an input device 60, and a telecommunications server 70. Computer 40 includes familiar computer components such as a processor 90, and memory storage devices, such as a random access memory (RAM) 100, a disk drive 110, and a system bus 80 interconnecting the above components. A telephone trunk line 120 and individual telephone lines 130 are coupled to telecommunications server 70. Handsets 140, (also telephones or telephone handsets) may be coupled to individual telephone lines 130.

Handsets 140 are preferably analog signal telephone handsets, however alternatively they may be any well known type of digital or analog telephone handset. A mouse is but one example of an input device 60, also known as a pointing device. Other types of input devices may include trackballs, drawing tablets, microphones (for voice activated input), and the like. Telecommunications system 20 may be coupled to a computer network 150 through use of a network interface 160 such as an Ethernet card, a modem, and the like.

RAM 100 and disk drive 110 are examples of tangible media for storage of data, message files, computer programs, drivers for the telecommunications server, embodiments of the herein described methods, and the like. Other types of tangible media include floppy disks, removable hard disks, optical storage media such as CD-ROMS and bar codes, and semiconductor memories such as flash memories, read-only memories (ROMS), and battery-backed volatile memories.

In a preferred embodiment, telecommunications system 20 includes a PC compatible computer having '586 or '686 class based microprocessors, such as the Athlon™ microprocessor from AMD. Further, in the present embodiment, telecommunications system 20 utilizes the WindowsNT™ operating from Microsoft Corporation, and runs AltiWare™ IP and AltiWareOE software from AltiGen Communications, Inc. Telecommunications server 70 are preferably embodied as a Triton DSP PCI based and at least one Quantum telephony ISA based plug-in expansion boards from AltiGen Communications, Inc. These boards are also coupled to a dedicated data bus, such as the MVIP bus, or the like.

FIG. 2 is representative of but one type of system for embodying the present invention. It will be readily apparent to one of ordinary skill in the art that many system types of hardware and software configurations are suitable for use in conjunction with the present invention. For example, processor such as the G4 from Motorola, PentiumIII from Intel, and the like may be used, further any computer communications bus may be used in alternative embodiments of the present invention. Further telecommunications system 20 may operate under the LINUX operating system, may operate under MAC OS from Apple Computer, BeOS from Be, Incorporated, and the like.

Figure 3:
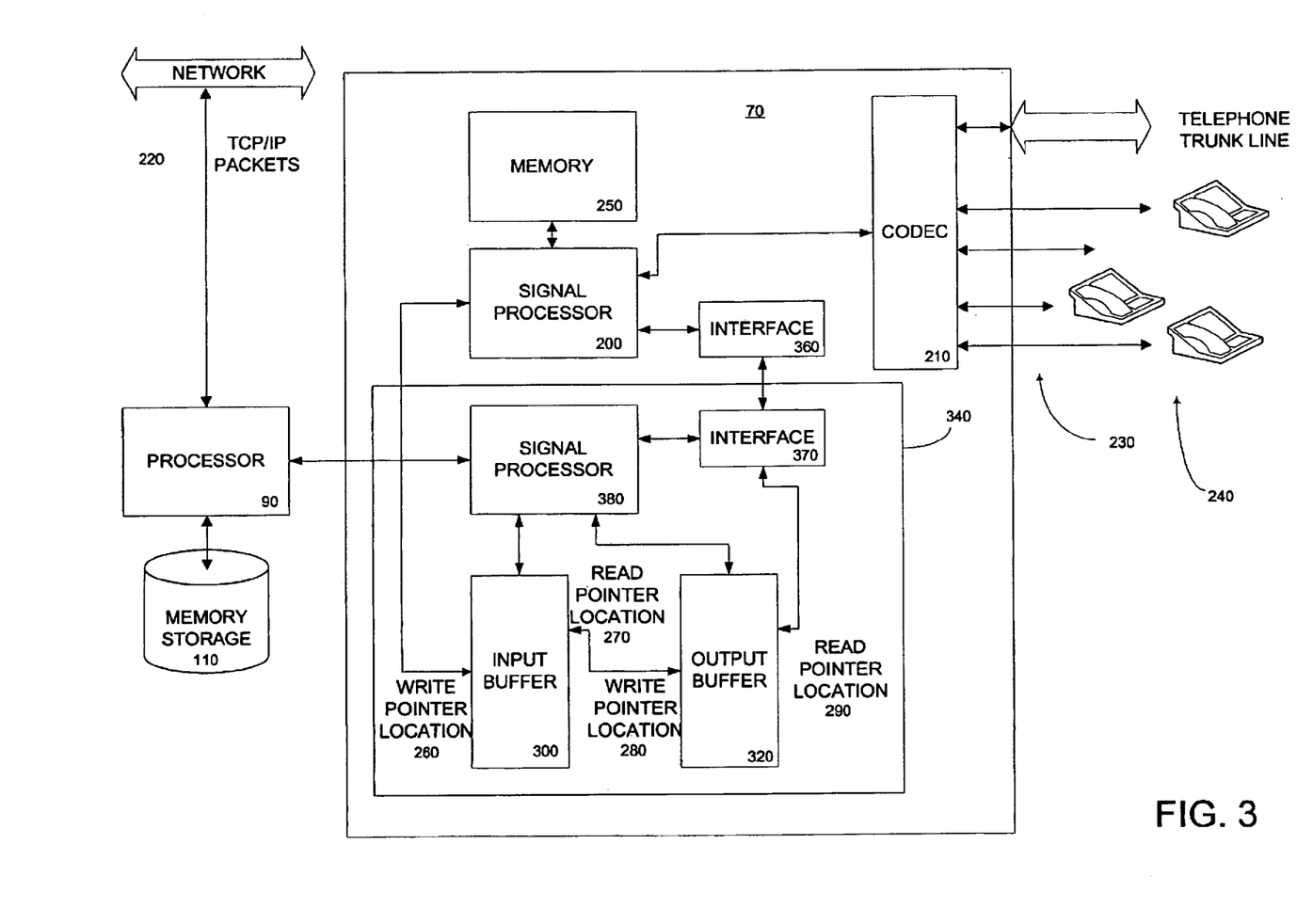
FIG. 3 is a more detailed block diagram of a portion of an embodiment of the present invention.

FIG. 3 is a more detailed block diagram of a portion of a telecommunications system according to an embodiment of the present invention. FIG. 3 illustrates processor 90, disk drive 110, and telecommunications server 70. In the present embodiment, telecommunications server 70 includes a signal processor 200, a digital to analog and analog to digital coder (CODEC) 210, and a memory 250. Telecommunications server 70 interfaces with telephone extension lines 230, and in turn, telephone extension lines 230 are coupled to telephone handsets 240. Processor 90 is coupled to a computer network 220, as discussed above.

In FIG. 3, processor 90 is used to control the operation of telecommunications server 70 according to instructions from the AltiWare software previously described. In one embodiment of the present invention, AltiWare software, operates in a multi-threaded multi-tasking environment, where each thread monitors the status of a particular telephone extension line 230. The status of the particular telephone extension line is typically represented as a state machine in the software.

In the present embodiment, processor 90 is also used to convert incoming audio messages to message files in a predefined storage format, and to convert message files and voice prompt files from predefined storage formats to an output format (typically digital signals). In the present embodiment, two specific storage format can be used for audio messages including the well-known "wav" file format, and a pulse coded modulation scheme (PCM). The voice data is typically stored and played-back in a streaming manner.

In other embodiments of the present invention, a single storage format may be used. In other embodiments, other formats for storage of audio messages and the like are known to those of ordinary skill in the art and can be used. For example, formats such as the "RealAudio" format, from Real Networks, Inc., Motion Picture Experts Group Payer 3, MP3, G.723.1 and the like may be also be used in embodiments of the present invention.

In the present embodiment, memory storage 110 is used to store audio messages, such as voice messages, numeric telephone numbers, caller databases, voice prompt files, computer network addresses: for example IP addresses, domain names, available ports; embodiments of the present invention, e-mail addresses, data and the like.

In this embodiment, processor 90 is also used to maintain a list of telephone numbers and a mapping of these telephone numbers. In particular, processor 90 maintains a list of physical telephone extensions 230 and "virtual" telephone numbers, i.e. telephone numbers that are accessed across computer network 220. As will be described further below, when a telephone call is received, processor 90 determines whether the telephone call is a physical telephone extension or a virtual telephone number.

In the case the telephone call is for a physical telephone extension, in this example, processor 90 connects the telephone call to the appropriate telephone extension 230. In the case the telephone call is for a virtual telephone number, processor 90 initially determines a remote telecommunications system is associated with the virtual telephone number. In another embodiment, signal processor 200 maintains the list of telephone numbers and performs the mapping. In still another embodiment, processor 90 and signal processor 200 work together to maintain the list and perform the mapping.

In the present embodiment, processor 90 is also used to implement telephone call switching functionality. For example, incoming telephone calls may automatically routed to a computer process that may present the caller with a menu of options the caller may select from, and may process the caller's selections. In the present embodiment, types of switching functions that may be provided include, call transferring, call forwarding, call waiting, and the like. In the present embodiment, the switching functions are programmable by the administrator of the telecommunications system. Further, switching functions available may be programmable according to time of day, location of the caller, and the like. Other programmable functions may also include setting time-out limits and messages, setting call-back numbers, and the like.

As will be described below, packet portion 340 is used to handle packetized communications between telecommunications system and a remote telecommunication server. Similarly, as a remote telecommunications system, packet portion 340 is then used to handle communications between it and telecommunications system.

Signal processor 200 is embodied as a Texas Instruments TMS320C5X digital signal processor (DSPs), and is coupled to receive instructions, data, and the like from processor 90. Of course DSPs from other manufacturers may be used in other embodiments of the present invention. Memory 250 is used to store local instructions, voice recognition algorithms, data for signal processor 200, DTMF data, and the like.

In the present embodiment, signal processor 200 also provides telephone switching functionality to each telephone extension line. For example, in this embodiment, signal processor 200 is used to detect off-hook conditions, to provide tone generation, to detect and process key-pad (DTMF) tones generated from each telephone handset 240, to connect incoming telephone calls to appropriate extensions, and the like. Other types of switching are contemplated, such as handling incoming and outgoing trunk calls, call transfers to and from IP trunks, call forwarding, message notification, reminder calls, multi-location conferencing, call parking, call waiting, and the like. In some embodiments, signal processor 200 and/or processor 90 are both used to handle automatic call distribution, system call-backs, calling out from voice mail, boomerang, dial last caller, speed dialing, call accounting, CallerID, voice mail, mixed media messaging, MS Exchange integration, client console support, and the like.

In one embodiment, signal processor 200 is also used to provide messaging functionality, such as an implementation of a voice mail server. In particular, signal processor 200 outputs instructions, user prompts, messages from voice mail boxes, and the like, to the messaging user. Further, signal processor 200 receives function selections in the form of DTMF tones, spoken instructions, spoken messages, and the like from the messaging user. As discussed above, memory storage 110 may be used to store data associated with the messaging functionality, such as voice prompts, the incoming messages, outgoing messages, and the like.

In another embodiment, signal processor 200 is also used to convert or "recognize" particular incoming audio messages and translate the messages into a computer recognizable form. For example, signal processor 200 can recognize the spoken words "three, two, one" as the numeric number "3,2,1", e.g. ASCII character equivalents. As another example, signal processor 200 can recognize the spoken word "yes" or "ok" as an affirmative response, and "no" as a negative response. In some embodiments, signal processor 200 can use any conventional voice recognition algorithms. In embodiments destined for non-English speaking countries, voice recognition algorithms specific to the native languages may be used.

In an alternative embodiment of the present invention, processor 90 may be used to perform the voice recognition process instead of signal processor 200. In still another embodiment, the voice recognition process may be split between processor 90 and signal processor 200.

Signal processor 200 typically comprises a multi-process environment wherein each process monitors the off-hook and in some embodiments the messaging the status of a particular telephone extension line 230. The status of the particular telephone extension line in off-hook mode is represented as a state machine within signal processor 200. Further, the status of the particular telephone extension line within a voice mail messaging mode is represented as another state machine within signal processor 200. In one embodiment of the present invention, signal processor 200 can process up to twelve telephone extension lines being simultaneously in off-hook mode or in voice mail messaging mode. In alternative embodiments, monitoring of states of a greater or fewer number of telephone extension lines 230 is contemplated.

As is illustrated in FIG. 3, CODEC 210 is used to provide an interface between users on telephone extension lines 230 and signal processor 200. In the present embodiment, CODEC 210 digitizes analog messages and analog signals from users on telephone extension lines 230. CODEC 210 also converts digital signals from signal processor 200, processor 90, and the like, into analog signals for users on telephone extension lines 230. In the present embodiment, the analog signals include audio messages to and from users, dial tone and multifreqency (DTMF) tones, and the like. The analog signals also include voice prompts or phrases that provide voice prompting capability to users on telephone extension lines 230, messages recorded by users, and the like. Examples of voice prompts or phrases, include messages that instruct the user which keys on a telephone to select to perform particular functions, messages that tell the user how many messages are pending, requests for instructions, requests user input, and the like.

FIG. 3 also illustrates an interface 350 between signal processor 200 and packet portion 340. In this example, interface 350 includes interface logic 360 and 370, and physical/logical interface 365. In the present embodiment, physical/logical interface 365 follows the MVIP-90 compatible protocol, and interface logic 360 and 370 provides the appropriate signaling. In alternative embodiments of the present invention, alternative interfaces, such as specified by Dialogic, and the like may also be used.

In the present embodiment, packet portion 340 includes signal processor 380 and an input buffer 300 and an output buffer 320. Locations where input buffer 300 are written to are specified by a write pointer 260, and locations where input buffer 300 are read from are specified by a read pointer 270. Further, locations where output buffer 320 are written to are specified by a write pointer 280, and locations where output buffer 320 are read from are specified by a read pointer 290.

Signal processor 380 provides write pointer 260, read pointer 270, write pointer 280, and read pointer 290, to input buffer 300 and output buffer 320, respectively. Further, signal processor 200 stores and retrieves data from these buffers, in response to the pointer, as will be described further below. In the present embodiment, input buffer 300 is typically a 80 byte wide×20 deep buffer, and output buffer 320 is typically a 40 byte wide×80 deep buffer. These buffers may be embodied as one or more dynamic random access memories (DRAM). The buffers are typically circular, so that locations can be reused. In alternative embodiments, different sized memories can also be used.

Signal processor 380 is typically a multi-process environment. Accordingly, in the present embodiment, eight network based telephone calls can be performed at the same time. To implement this capability, input buffer 300 and output buffer 320 are typically segmented, such that each network based telephone call supported, have use of a reserved portion of the respective buffers. For example, a first telephone call is allocated use of input buffer locations 0–1023, a second telephone call is allocated use of input buffer locations 1024–2023, and the like. Further, for each network based telephone call, separate read and write pointers for each buffer may be allocated and maintained. For example, an input buffer write pointer associated with the first call may point to location 1000, whereas an input buffer write pointer associated with a second call may point to location 2000, and the like.

In this embodiment, processor 90 is also used to send and receive packets of data across network 220. This embodiment includes two types of packets, packets that include control and status data, and packets that include voice data. Typically, the control data, is used to help set up communications between a server and a client. In this example, the control data may include the network call-back address of the caller.

In the present embodiment processor, 90 utilizes the Internet Protocol (IP) for enhancing packet transmission reliability over a packetized network. In a packet sending mode, processor 90 receives packets of TCP data from packet portion 340, and then divides the TCP packets into shorter packets of data. In the present embodiment, signal processor 380 provides the TCP packetizing of switching data and voice data. In this embodiment, processor 90 uses IP to format the TCP packets into TCP/IP packets and then sends the TCP/IP packets across network 220. According to TCP/IP protocol, processor 90 also monitors network 220 for ACK signals from the receiving telecommunications system. In alternative embodiments, processor 90 performs the TCP packetizing in addition to IP packetizing. In such embodiments, packet portion 340 delivers streams of digital data (such as switching data and voice data) to processor 90.

Processor 90 also receives TCP packets from packet sending telecommunications systems, and in response sends ACK signals back to the other systems. In the present embodiment, processor 90 strips IP headers from the packets and then forwards the received TCP packets to telecommunications server 70. More specifically, the TCP packets are sent to packet portion 340 for processing. In the present embodiment, processor 90 may utilize other network protocols in addition to or instead of IP, for example, UDP or the like. In the present embodiment, signal processor 380 receives the TCP packets and reassembles them into the right order. The switching and voice data recovered are then sent to signal processor 200 for further processing.

Signal processor 380 is embodied as a Texas Instruments TMS320C6201 digital signal processor (DSPs), and is coupled to receive instructions, data, and the like from processor 90, and/or signal processor 200. Of course DSPs from other manufacturers may be used in other embodiments of the present invention. In the present embodiment, memory 390 is used to store local instructions, data for signal processor 380, intermediate data, embodiments of the invention, and the like.

Figure 4A:
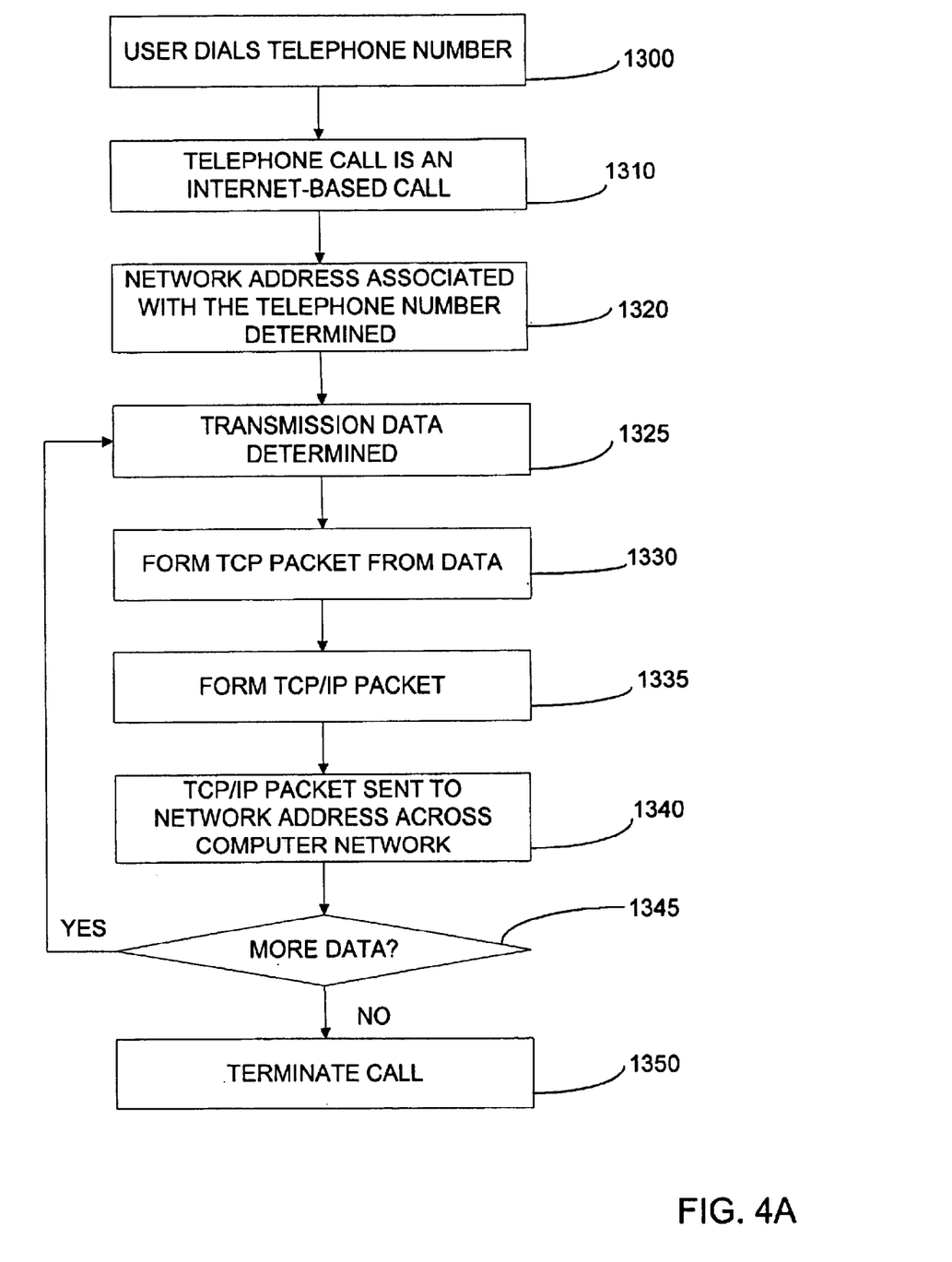
FIGS. 4A–4C illustrate flow diagrams of an embodiment of the present invention.
Figure 4B:
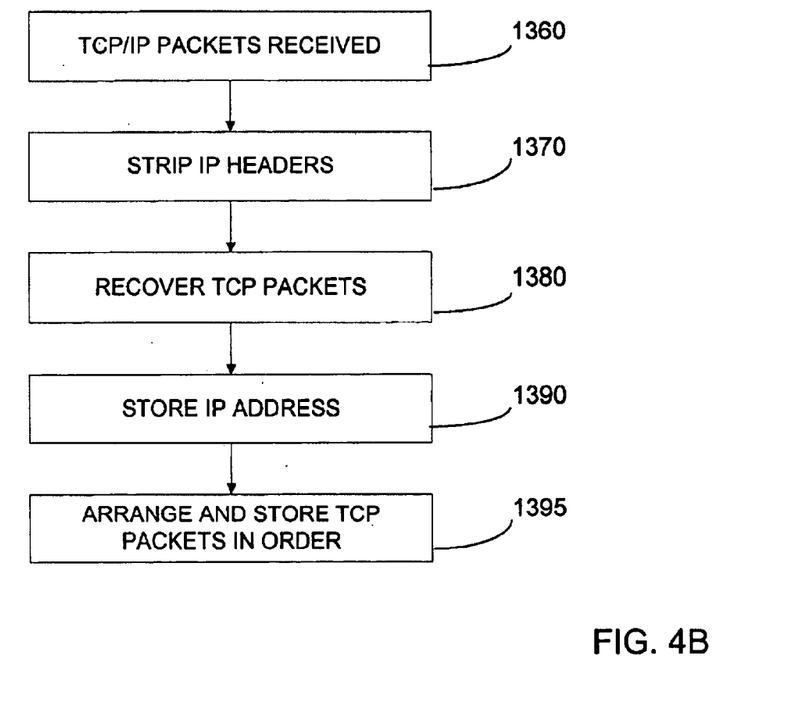
Figure 4C:
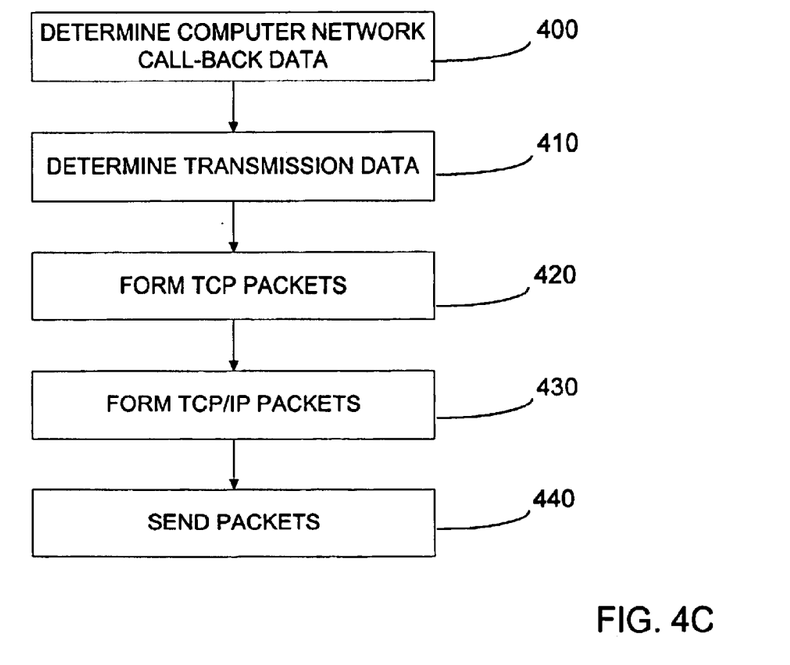

FIGS. 4A–4C illustrate flowcharts of an embodiment of the present invention.

FIG. 4A illustrates a flowchart of an embodiment of a caller's telecommunications system sending data to a receiver's telecommunication system via a computer network. In FIG. 4A, initially a caller dials a number on their telephone, step 1300. In the present embodiment, dialing is typically by way of the caller pressing a series of DTMF keys on her telephone representing a particular telephone number. Alternatively, the caller may press a series of keys providing speed dial-type capability, speak a name, a series of numbers, and the like. In another embodiment, dialing may occur by the caller selecting a name, a telephone number, and the like from a list on a computer display associated with the caller.

In response to the "dialed" number, within the caller's system, signal processor 200 or processor 90, determines that the telephone call should be completed across the computer network, step 1310. In one embodiment, particular telephone calls are always made across the computer network. In alternative embodiments, the decision may be made depending upon time of day, long distance rates, computer network performance, and the like.

Next, the computer network address of the telecommunications system associated with the dialed number is determined, step 1320. In the present embodiment, processor 90 receives the telephone number from signal processor 200. In particular, the computer network address pre-associated with the telephone number is typically stored in memory storage 110 and retrieved by processor 90. In the present embodiment, the network address is an IP address. In alternative embodiments, the network address may be any number, characters, or words that represents a path to the receiving telecommunications system, for example, a domain name, a uniform resource locator (URL), or the like.

The data to be transmitted to the computer associated with the network address is then determined, step 1325. One type of data is termed call set-up data. The call set-up data may include a telephone number, a connection request, a computer network address, voice data, caller identifying data such as the caller telephone number, caller computer network address, and the like, DTMF tones, and the like. Another type of data may include voice data.

Processor 90 next generates groups or frames of data packets, step 1330. In the present embodiment, these data packets are encoded using TCP. When each TCP packet is formed, processor 90 typically prepends a time stamp (original time stamp or OTS) indicating when the TCP packet was formed by processor 90. Typically, each TCP packet represents 10 milliseconds worth of data in the present embodiment. In the present embodiment, IP headers are typically added to each TCP packet, step 1335.

Next, the TCP/IP packets that are formed are then sent across the computer network to the IP address specified, step 1340. If no more data packets are to be transmitted, step 1345, the call is terminated, step 1350. Termination typically includes hanging up the telephone, or otherwise terminating the transfer of data.

The more significant steps for the above packet transfer process have been described. However it should be understood that may steps, known to one of ordinary skill in the art have not been described, merely for sake of compactness in disclosure. For example, the intricacies of TCP acknowledgments (ACK), and the like are not described. Such steps may or may not be required when implementing alternative embodiments of the present invention.

FIG. 4B illustrates a flowchart of an embodiment of a receiver's telecommunications system receiving data from a sender's telecommunication system via a computer network. In FIG. 4B, the TCP/IP packets are received by the receiving telecommunications system across the network, step 1360. The IP headers are then stripped, step 1370, and the individual of TCP packets are then obtained step 1380. The IP headers may be stored in a memory, such as memory 250, in embodiments of the present invention, step 1390. In one embodiment of the present invention, the IP headers indicate the network address of the caller's telecommunications system.

Next, the TCP packets are re-ordered and re-assembled, step 1395. This technique may be implemented by the techniques disclosed in co-pending application serial No. 60/139,342, filed Jun. 15, 1999, entitled Session Time Stamp Method and Apparatus, described above.

FIG. 4C illustrates a flowchart of an embodiment of the receiving telecommunications system returning data to the caller's system via a computer network. In FIG. 4C, the computer network address of the caller, termed computer network callback data, network call-back data, call-back data, or the like, is determined, step 400. In the present embodiment, this data comprises the IP headers stored in memory 250 in step 1390, above, and/or caller identifiable data determined in step 510, below, or the like. In alternative embodiments, the computer network call-back data is pre-registered in the receiver's system, and a simple caller identification indicator is transmitted from the caller's system.

Return data to be transmitted to the caller is then determined, step 410. As will be described below, the return data may include a telephone number, voice data, caller identifying data, voice prompts, data from a voice mail server, and the like.

Similar to the caller's system, processor 90 of the receiver's system next generates groups or frames of data packets, step 420, typically following TCP protocols. In the present embodiment, IP headers are also typically added to each TCP packet, step 430. Next, the TCP/IP packets that are formed are then sent across the computer network to the caller's system, step 440. The caller's system receives the TCP/IP packets in a process similar to the method described in FIG. 4B, above.

Figure 5A:
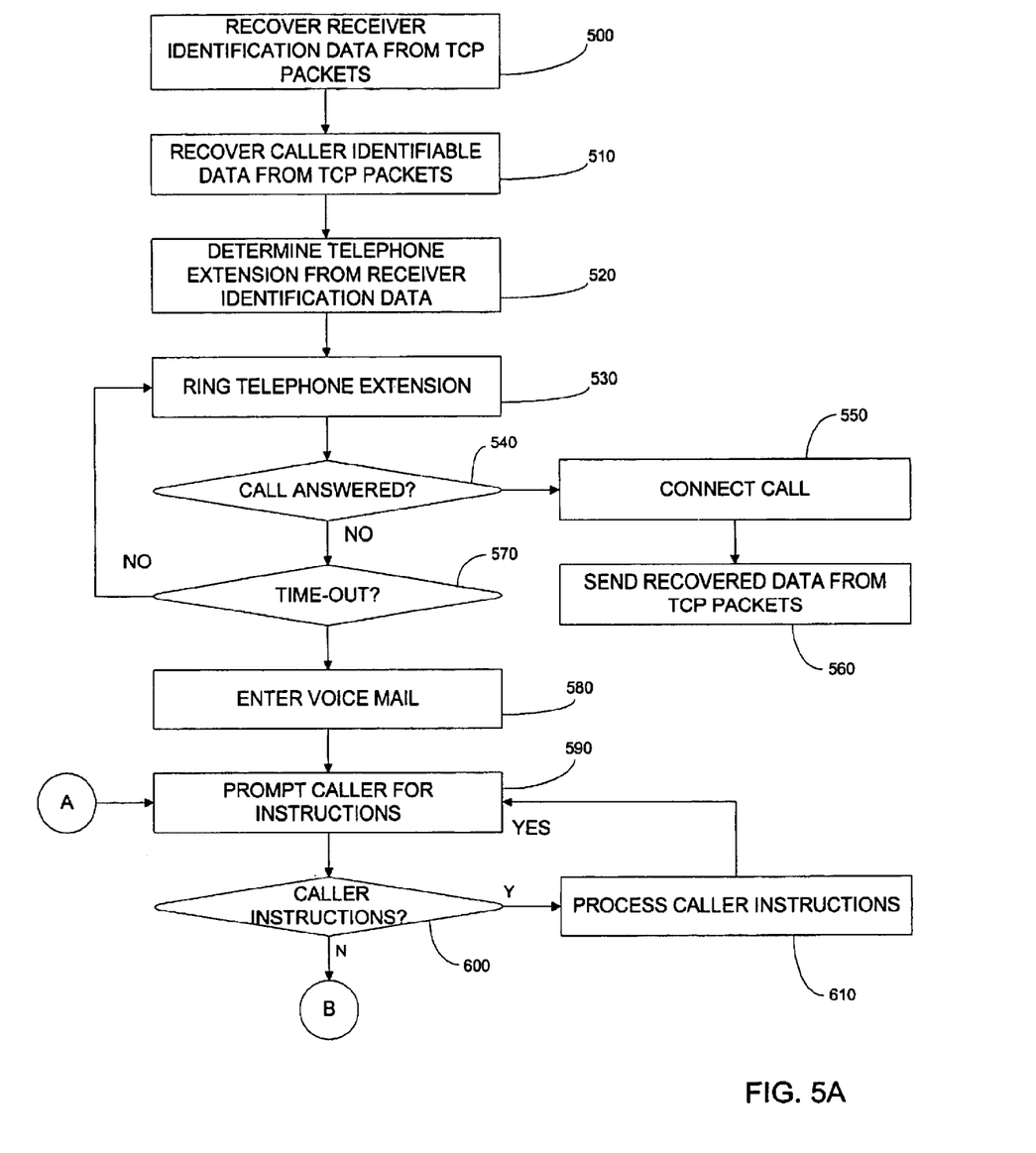
FIGS. 5A–5C illustrate flow diagrams of another embodiment of the present invention.
Figure 5B:
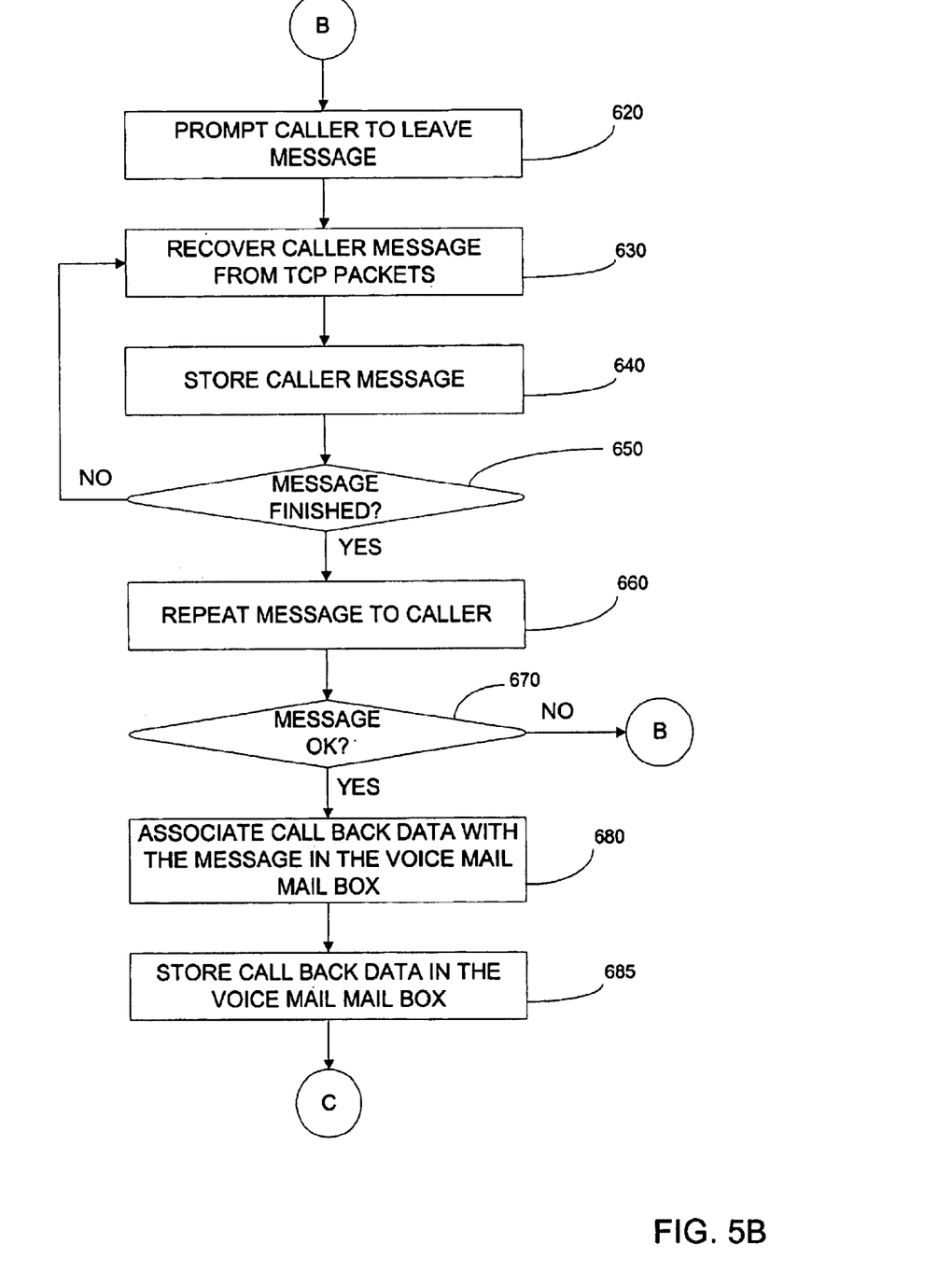
Figure 5C:
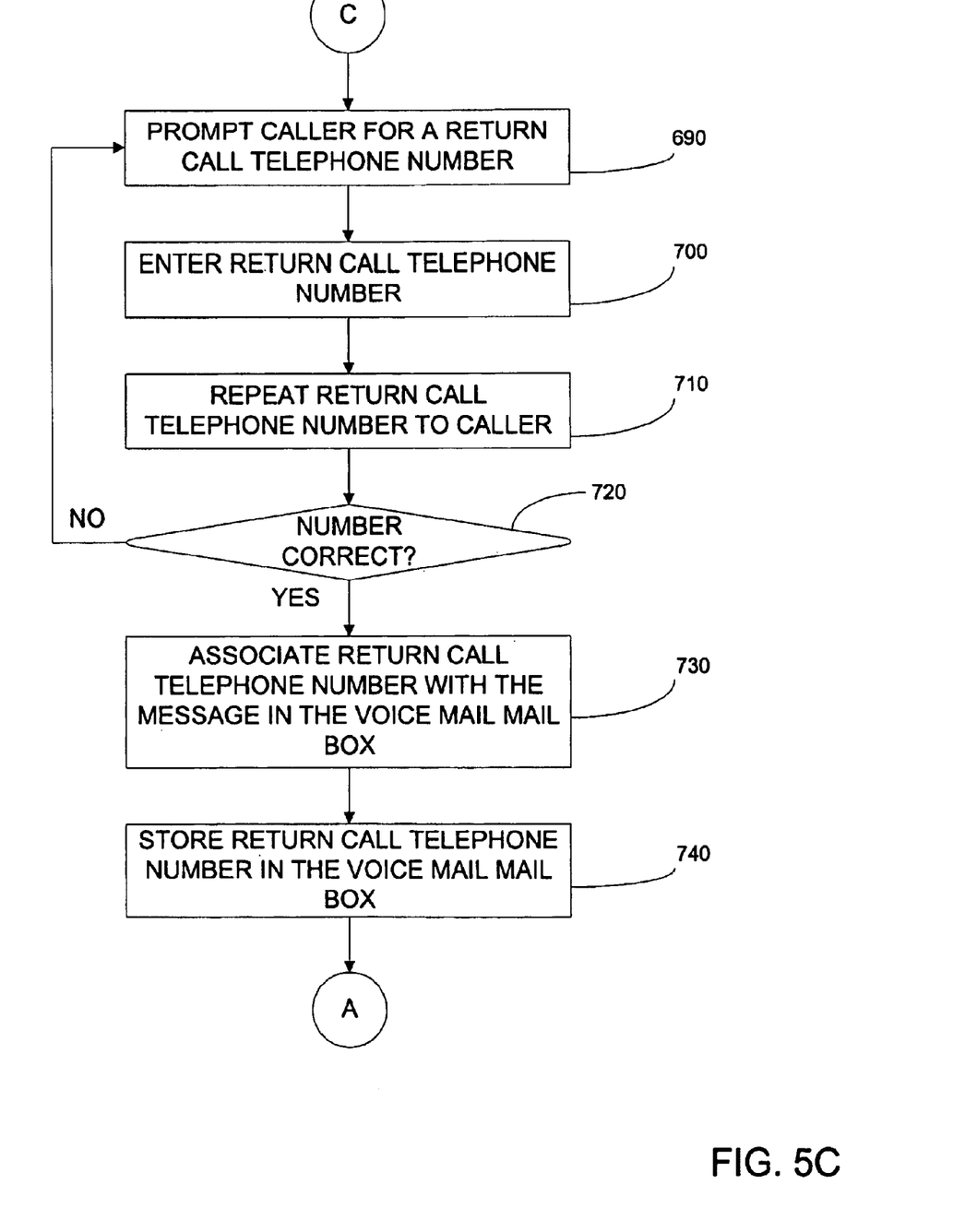

FIGS. 5A–5C illustrate flowcharts of an embodiment of a receiver's telecommunications system processing data from a caller's telecommunication system.

Initially, the data stored and received within the TCP packets are recovered and stored. More specifically, the TCP packets typically includes an indication of the party being called, step 500. For example, the data can include the receiver's full telephone number, an extension number, a receiver user name, or the like. Further, the recovered data may include data indicating the identification of the caller or caller identifiable data, step 510. For example, the caller identifiable data may include the telephone number of the caller, the caller name or user name, a caller extension number, the caller's computer network address, and the like.

In response to the data regarding the party being called, signal processor 200 or processor 90 determines the appropriate telephone extension to ring, step 520. For example, in one embodiment where the data is a user name, signal processor 200 or processor 90 determines the appropriate telephone extension based upon the user name. Such data associations may be stored within memory storage 110 and/or memory 250. In other embodiments, the data may be user initials; a particular business group, for example, sales, customer service, information, or the like. In such embodiments, the appropriate telephone extensions may be pre-associated with such data.

In response to the incoming telephone call, signal processor 200 sends ringing signals to the particular telephone extension, step 530. If the particular telephone extension is answered, step 540, the incoming telephone call is connected to the particular extension, step 550. Subsequently, data transmitted from the caller's system is then received by the particular extension, step 560. In the present embodiment, the received data is typically analog data, such as voice data, fax data, analog modem signals, and the like. Alternatively, in other embodiments the data may be digital data, multi-level digital data, or the like.

In the present embodiment, if the particular telephone extension is not answered within a predetermined amount of time, step 570, the incoming call is typically transferred to a messaging state machine (a voice mail server), step 580. In the present embodiment, the voice mail may be treated as a typical internal telephone extension line and rings at least once before the incoming call is answered. As disclosed above, in one embodiment, signal processor 200 provides the voice messaging functionality such as voice mail.

Initially, the voice mail system outputs instructions to the caller and typically prompts to the caller for instructions, step 590. Instructions to the caller typically include how to leave a message, how to transfer to an operator, how to bypass the instructions menu, and the like. Typically, voice prompt files, and the like are retrieved from memory storage 110 and transmitted to the caller's system, as described in FIG. 4C, above. These voice prompt files are then played to the caller through the caller's telecommunications server.

If the caller inputs instructions, step 600, the instructions are processed by signal processor 200 within the context of the voice mail system, step 610. In the present embodiment, instructions take the form of DTMF tones in response to the caller pressing buttons on a numeric keypad. In alternative embodiments, other forms of caller input may include spoken instructions, and the like.

In the present embodiment, if no instructions are received from the caller, the caller is typically prompted to leave a voice mail message, step 620.

Next, telecommunications module 70 then reconstructs the voice mail message from data stored within TCP packets, step 630. In other embodiments of the present invention, the message need not be a voice message, and may represent an analog or digital transmission such as a facsimile, file transfer, and the like.

In the present embodiment, the voice mail message may be compressed on the caller side, prior to transmitting it across the computer network. Compression schemes may include a pulse coded modulation, an MP3 format, a streaming format, and the like. In alternative embodiments other types of compression schemes may be used to advantageously reduce the amount of data transmitted. In the present embodiment, the data may be directly stored into memory 110 of the receiver's system with or without further conversion or compression, step 640.

Typically, telecommunications module 70 stops recording when telecommunications module 70 determines that the caller has hung up or when the caller presses a particular telephone keypad key or combinations of keys, step 650. In the present embodiment, if the caller has not terminated the call, the caller can review the message before sending the message, step 660. The caller may then re-record the message or accept the message, step 670.

After the message is accepted, the message becomes associated with the computer network call-back data, step 680. Next, the computer network call-back data and the message are stored in the appropriate voice mailbox associated with the called telephone, step 685. The computer network call-back data typically includes the caller identifiable data determined in step 510, the IP address determined in step 1390, and the like. In alternative embodiments, the network call-back data may include a uniform resource locator (URL) of the caller's system, or any other computer network identifier that identifies the network address of the caller's system. In embodiments of the present invention, caller identifiable data may include the caller's name, a caller path, a telephone number or extension, a business group, or the like. In general, these data are referred to as call-back data.

In an alternative embodiment of the present invention, the call-back data merely indicates where the call is initiated from, but not necessarily identify the number where the caller can be reached. In such embodiments, the caller may also be prompted for a specific return call data, step 690. In response, the caller may enter her return call number, step 700. The call back number may be entered by the caller hitting a series of DTMF tones, or the caller speaking a return call number, as described in co-pending U.S. patent application Ser. No. 09/255,358, filed Feb. 23, 1999, entitled Call-back Number Voice Capture Method and Apparatus. That patent application is herein by incorporated by reference for all purposes.

In the present embodiment, if the return call number has been captured correctly, step 720, it is associated with the message, step 730. The return-call number is also stored in the voice mailbox associated with the called telephone number, step 740.

In the present embodiments, when the "owner" of the voice mailbox where a message from a computer network is left, subsequently calls the messaging system, the message can be played back to the owner in a conventional manner. If call-back data or a return call number has been associated with the message, the messaging system may prompt the owner as whether to make a telephone call according to the call-back data, the return call number, or the like. In the present embodiment, when the owner indicates she wants to return the call, that data is then used to make the call. By providing such call-back data, the owner need not write down the call-back data need not enter the call-back data into the computer manually.

In alternative embodiments of the present invention, the process of leaving a message and leaving the return call number may be reversed. For example, before leaving a message, the caller may be prompted to leave a call-back number.

In another embodiment of the present innovation, the technique may include the following steps for a calling telecommunications system:

1. Initially a caller at a first telecommunications system dials a telephone number to reach a person.
2. The first telecommunications system determines the computer network address of the person in response to the dialed telephone number.
3. The first telecommunication system constructs call set-up packets and includes a call-back number for the caller in a destination field of the packets.
4. The call setup packets are encapsulated with network header data that includes its own network address.
5. The encapsulated packets are sent to a second telecommunications system.
6. The call is then connected to a voice mail server on the second telecommunications system wherein the call-back number of the caller is stored.

The technique may include the following steps for a receiving telecommunications system:

1. The second telecommunications system receives the call setup packets from the first telecommunications system.
2. The source network address of the first telecommunications system is stored.
3. The network headers are stripped.
4. The call back data is determined and stored.
5. The call is connected to the voice mail and is cross-referenced to the call back data.

The technique may also include the following steps for a receiving telecommunications system:

1. The person being called retrieves her voice mail.
2. The person request to initiate a telephone call to the caller.
3. The second telecommunications system retrieves the call back data associated with the caller.
3. The first telecommunication system constructs call set-up packets and includes a call-back number for the caller in a destination field of the packets.
4. The call setup packets are encapsulated with network header data that includes its own network address.
5. The encapsulated packets are sent to the first telecommunications system to request a telephone call.

Conclusion

In the foregoing specification, the invention has been described with reference to specific exemplary embodiments thereof. Many changes or modifications are readily envisioned. Many changes or modifications are readily envisioned. For example, the network utilized may include the Internet, an internal IP based network, an IPX network, and the like. In alternative embodiments, different types of computer network identifiers are contemplated including IP addresses, URLs, domain name server (DNS) address, and the like. Further, different types of caller identifiers are contemplated including user name, caller extension, geographic location, caller priority, and the like.

Other embodiments of the present invention may include combinations, sub-combinations, and or additions to the above disclosed embodiment. As an example, many different voice recognition techniques can be used for recognizing a spoken callback number prior to storage. Further different voice recognition techniques can be applied for different spoken languages.

In another embodiment, the caller may be an IP telephone. In such an embodiment, after a call is initiated by the IP telephone, telephone server 70 receives call set-up data in the form of set-up IP packets across a computer network from the IP telephone. In the present embodiment, the set-up IP packets may include the network call back data.

In the present embodiment, the call back data may include computer network and/or addresses telephone numbers of the telecommunications system for call setup. Further the call back data may include the network address for the voice data stream. In this embodiment, the network address may include any combination of IP address, sockets, e-mail address, DNS name, and so on.

The block diagrams of the architecture and flow charts are grouped for ease of understanding. However, it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for operating a telecommunications system comprises:

receiving over a computer network, a plurality of data packets from a first telecommunications system, in a second telecommunications system;

determining a telephone number in response to a first set data packets from the plurality of data packets;

determining computer network call-back data in response to a second set of data packets from the plurality of data packets;

determining message data in response to a third set of data packets from the plurality of data packets; and storing the message data and the computer network call-back data in the second telecommunications system, the message data and the computer network call-back data associated with the telephone number.

2. The method of claim 1 wherein the message data comprises voice data.

3. The method of claim 1 wherein the telephone number is associated with a telephone extension coupled to the second telecommunications system.

4. The method of claim 1 wherein the plurality of data packets comprise IP packets.

5. The method of claim 4 wherein the computer network call-back data one of an IP address, a URL, and a domain name.

6. The method of claim 1 wherein the message includes the computer network call-back data.

7. The method of claim 1 wherein storing the message data and the computer network call-back data comprises storing the message data and the computer network call-back data in a voice mail server.

8. A computer program product for operating a telecommunications server including a processor comprises:

code that directs the processor to store a plurality of data packets from a remote telecommunications server, over a computer network, in a memory;

code that directs the processor to determine a telephone number in response to a first set data packets from the plurality of data packets;

code that directs the processor to determine network call-back data in response to a second set of data packets from the plurality of data packets; and code that directs the processor to store the network call-back data, the network call-back data associated with the telephone number;

wherein the codes reside on a tangible media.

9. The computer program product of claim 8 further comprising:

code that directs the processor to determine message data in response to a third set of data packets from the plurality of data packets; and code that directs the processor to store the message data, the message data associated with the telephone number.

10. The computer program product of claim 9 wherein the message data represents voice data.

11. The computer program product of claim 8 wherein the telephone number is associated with a telephone coupled to the telecommunications server.

12. The computer program product of claim 8 wherein the plurality of data packets comprise TCP packets.

13. The computer program product of claim 8 wherein the network call-back data comprises one of an IP address, a URL, and a domain name.

14. A telecommunications system comprises:

a processor; and a processor readable memory coupled to the processor, the processor readable memory comprising:

code that directs the processor to store a plurality of data packets from another telecommunications system, in a memory;

code that directs the processor to determine a destination identifier in response to a first set data packets from the plurality of data packets;

code that directs the processor to determine call-back data in response to a second set of data packets from the plurality of data packets;

code that directs the processor to associate the call-back data associated with the destination identifier; and code that directs the processor to store the call-back data.

15. The telecommunications system of claim 14 further comprising:

code that directs the processor to determine message data in response to a third set of data packets from the plurality of data packets; and code that directs the processor to associate the message data associated with the call-back data.

16. The telecommunications system of claim 15 wherein the message data comprises voice data.

17. The telecommunications system of claim 14 wherein the destination identifier is associated with a telephone associated with the telecommunications system.

18. The telecommunications system of claim 14 wherein the destination identifier comprises one of a telephone number, a telephone extension, and a user name.

19. The telecommunications system of claim 14 wherein the plurality of data packets comprise TCP packets.

20. The telecommunications system of claim 14 wherein the call-back data comprises one of an IP address, a URL, a domain name, and a telephone number.

* * * * *